US011485829B1

(12) United States Patent
Cheatham, III et al.

(10) Patent No.: US 11,485,829 B1
(45) Date of Patent: Nov. 1, 2022

(54) RADIATION CURED COMPOSITE MATERIALS

(71) Applicant: TerraPower, LLC, Bellevue, WA (US)

(72) Inventors: Jesse R Cheatham, III, Seattle, WA (US); Francesco Deleo, Redmond, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 214 days.

(21) Appl. No.: 16/828,940

(22) Filed: Mar. 24, 2020

Related U.S. Application Data

(60) Provisional application No. 62/823,475, filed on Mar. 25, 2019.

(51) Int. Cl.
*C08J 5/04* (2006.01)
*C08J 3/28* (2006.01)

(52) U.S. Cl.
CPC .. *C08J 5/04* (2013.01); *C08J 3/28* (2013.01)

(58) Field of Classification Search
CPC ..................................... C08J 5/04; C08J 3/28
See application file for complete search history.

(56) References Cited

U.S. PATENT DOCUMENTS

| | | | | |
|---|---|---|---|---|
| 5,591,784 | A | 1/1997 | Muranaka | |
| 2013/0164449 | A1 * | 6/2013 | Tadepalli | B29C 70/48 427/322 |
| 2016/0059449 | A1 | 3/2016 | Tien et al. | |

* cited by examiner

*Primary Examiner* — Jessica M Roswell
(74) *Attorney, Agent, or Firm* — FisherBroyles, LLP; Jeremy P. Sanders

(57) ABSTRACT

Radiation cured composite materials are greatly improved by enhancing the fiber to matrix bond by prewetting the fibers with an interface resin that has a curing agent mixed in with the interface resin. Furthermore, radiation curing the composite material at or near an expected operating temperature of the composite material improves the mechanical properties of the material by reducing thermally induced strains and stresses caused by thermally curing a material and subsequently cooling the material. Adding an interface resin with a curing agent to the fibers allows relatively thick parts, a must faster curing process, a wide variety of inexpensive and easily workable molding materials, the ability to maintain tight tolerances and reduce or eliminate spring-back, and a radiation cured material that approaches or exceeds the material characteristics of thermally cured composite materials.

17 Claims, 9 Drawing Sheets

FIG. 8

RADIATION CURED COMPOSITE MATERIALS

CROSS-REFERENCE TO RELATED APPLICATIONS

This application claims the benefit under 35 U.S.C. § 119(e) of U.S. Provisional Application No. 62/823,475, filed Mar. 25, 2019, the disclosure of which is incorporated, in its entirety, by this reference.

BACKGROUND

The field of the present disclosure is related to composite materials cured with radiation energy.

A fiber reinforced polymeric matrix composite (PMC) is made out of three primary components: the fibers, the matrix and the interface. The interface may also be referred to as binder or sizing. The fibers carry loads applied to the cured composite material and provide strength and stiffness to the composite material. The matrix provides the part's shape, protects the fibers against environmental agents and out of plane loading, and distributes applied loads among the fibers. The interface resin is a matrix-like material applied as a coating to the fibers with the purpose to increase adherence among fibers and the matrix. In many cases, the fibers are pre-wetted with interface resin material prior to being added to a mold and flooded with the remainder of the matrix material.

Prior methods and systems for curing composite materials require the application of heat (such as from ovens, warming blankets, autoclaves, and the like), and applied pressure for a specific amount of time which solidifies the resin from its liquid state through a polymerization process in which monomers form polymer chains of three-dimensional networks.

In contrast, radiation curing of PMCs offers shorter curing times and the ability to cure in the absence of applied heat. A radiative source may be used to apply radiation energy to initiate and sustain polymerization. In order to achieve matrix polymerization, a catalyst, also commonly referred to as curing agent or initiator, is typically used in the resin. For thermally cured advanced composites, given the long curing times required, in some cases greater than 4 hours for high-performance composites, adhesion among fibers and the matrix via the interface resin has been shown to be adequate, for most composite systems.

However, radiation cured polymeric resin composite materials have not been able to exhibit similar material characteristics when compared to thermally cured composite materials. Thermally cured high-end composite materials require a considerable amount of applied heat, typically on the order of from about 250° F. to about 750° F. and require curing times on the order of 3 or more hours. Furthermore, thermally cured PMCs have a limit to the thickness of the composite due to the exothermic nature of the curing reaction.

During polymerization additional heat is generated and the thicker the part, the more heat is generated. Beyond a certain thickness, typically around 20-40 mm, the exothermic chemical reaction raises the material temperature to eventually exceed the resin's flash point temperature which results in the curing parts catching on fire.

Consequently, to create thicker materials, multiple layers must be applied and cured sequentially rather than in a single fabrication lay-up and curing process, which reduces the overall strength of a single cured thick composite and further extends the manufacturing duration.

Finally, the curing temperatures required in a thermally cured composite material result in significant thermally induced stresses once the cured parts are cooled to room temperature. The thermal stresses are exacerbated where the thermally cured part is used in extreme cold temperatures.

It would be advantageous to provide radiation cured composite materials that have similar material properties of thermally cured composite materials without the aforementioned disadvantages. These, and other features, will become apparent from the following description.

SUMMARY

According to some embodiments, a reinforcing material comprises fibers, a radiation-curable resin, and a curing agent mixed in with the radiation-curable interface resin. The reinforcing material is essentially fibers prewetted with an interface resin containing a curing agent embedded in the bulk resin, which also includes a type of curing agent. In some embodiments, the curing agent causes polymerization of the interface resin in response to applied radiation. The radiation may be any suitable ionization radiation, such as one or more of ultraviolet, electron beam, x-ray, or gamma radiation.

In some instances, the fiber is one or more of carbon fiber, glass fiber, graphite fiber, aramid fiber, boron fiber, natural fibers, plant-derived fibers, ceramic fibers, silicon carbide fibers, aluminum oxide fibers, or basalt fiber. The fiber may be provided as a filament, a bundle of fibers, a matt of fibers, a weave of fibers, chopped fibers, or some other form of a single or plurality of fibers.

According to some embodiments, the resin is one or more of epoxy, polyester, vinylester, phenolic, polyimide, polybenzimidazole, polyphenylquinoxaline, nylon, polyester, polycarbonate, polyacetals, polyamide-imide, polyether-ether ketone, polysulfone, poly-phenyl sulfide, or polyether imide.

According to some embodiments, a fiber reinforced polymeric matrix composite material is made up of a plurality of reinforcing fibers; a first matrix material wetted on the plurality of reinforcing fibers; a first curing agent mixed in the first matrix material; a second matrix material into which the plurality of reinforcing fibers are embedded; and a second curing agent material mixed in the second matrix material.

In some cases, the first matrix material and the second matrix material are different polymeric matrix materials. In some cases, the first matrix material and the second matrix material are the same polymeric matrix materials.

In some examples, the first curing agent and the second curing agent are different materials. In other examples, the first curing agent and the second curing agent are the same materials. In some embodiments, the reinforcing fibers are one or more of carbon, glass, aramid, boron, basalt, or a combination.

According to some embodiments, a process includes the steps of wetting a reinforcing fiber with a first liquid polymer material, the first liquid polymer material having a first curing agent mixed therein; forming the reinforcing fiber into a desired shape; applying a second liquid polymer material, the second liquid polymer material having a second curing agent mixed therein; and applying radiation to the reinforcing fiber, the first liquid polymer and the second liquid polymer to cause the first liquid polymer and the second liquid polymer to cure into a hardened form.

The process of applying radiation may be performed at ambient temperature. The process of applying radiation may be performed at a temperature below ambient temperature. In some cases, the reinforcing fiber, the first liquid polymer, and the second liquid polymer are cooled to a temperature below 10° C. prior applying radiation. In some instances, the step of applying radiation is performed at a temperature selected to approximate an environmental temperature where the hardened form will be used. In other words, the curing temperature approximates an operating temperature of the cured PMC.

In some embodiments, the second liquid polymer material is added prior to the step of forming the reinforcing fiber into the desired shape. In some examples, the first liquid polymer material and the second liquid polymer material are the same material. In other examples, the first liquid polymer material and the second liquid polymer material are different materials.

Similarly, the first curing agent and the second curing agent may be the same material. In some cases, the first curing agent and the second curing agent are different materials.

In some examples, the step of applying radiation comprises applying an electron beam which may be applied at an intensity of between about 2 MeV and about 10 MeV.

The step of applying radiation may include applying repeated pulses of radiation. The step of applying radiation may include applying multiple forms of radiation, applying different intensities of radiation, or both.

In some examples, the step of applying radiation is performed while the step of forming the reinforcing fiber into the desired shape is being performed. As an example, as a wetted fiber is being wrapped around a mandrel, a radiation source may apply radiation to fibers that have already been applied to the mandrel while additional fibers continues to be wrapped around the mandrel.

In some cases, the radiation can be applied prior, during, or after the application of some heat.

In some cases, the radiation has a desired energy which may be selected based at least in part upon the thickness of the second liquid polymer material. In some cases, applying radiation is repeated two or more times. In some instances, subsequent steps of applying radiation are performed at different energy levels. The energy levels may be between about 1 MeV and 15 MeV when the radiation is an electron beam, and in some instances, is in the KeV range, such as between about 50 Key to less than 1 MeV, or between 100 KeV to less than 1 MeV.

BRIEF DESCRIPTION OF THE DRAWINGS

A better understanding of the features, advantages and principles of the present disclosure will be obtained by reference to the following detailed description that sets forth illustrative embodiments, and the accompanying drawings of which:

FIG. 8 is a mathematical explanation of the improved mechanical properties of reducing thermally induced stress, in accordance with some embodiments;

DETAILED DESCRIPTION

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

Figure 1A:
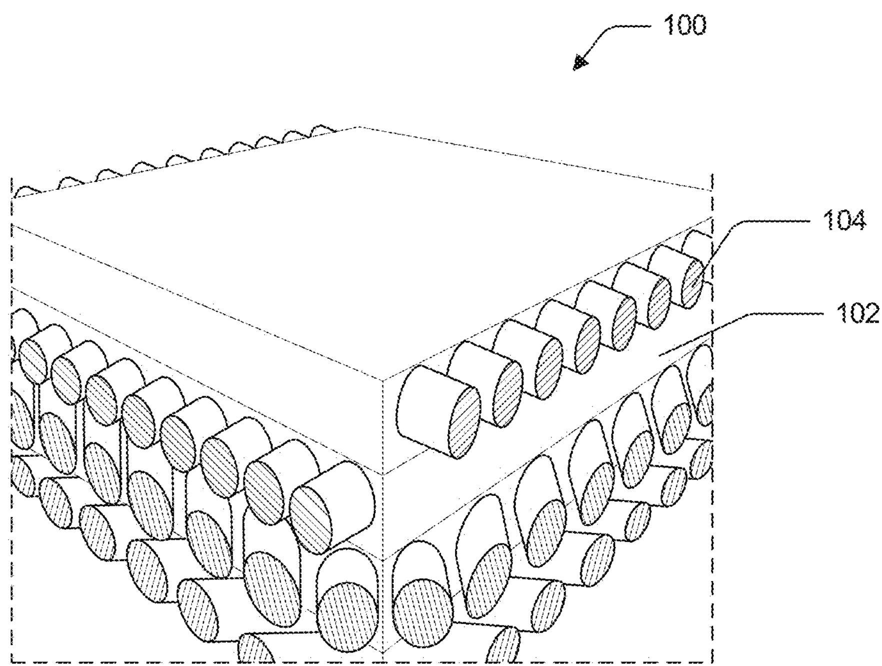
FIG. 1A shows a schematic cross-sectional illustration of a fiber reinforced polymeric resin composite ("PMC") material, in accordance with some embodiments.
Figure 1B:
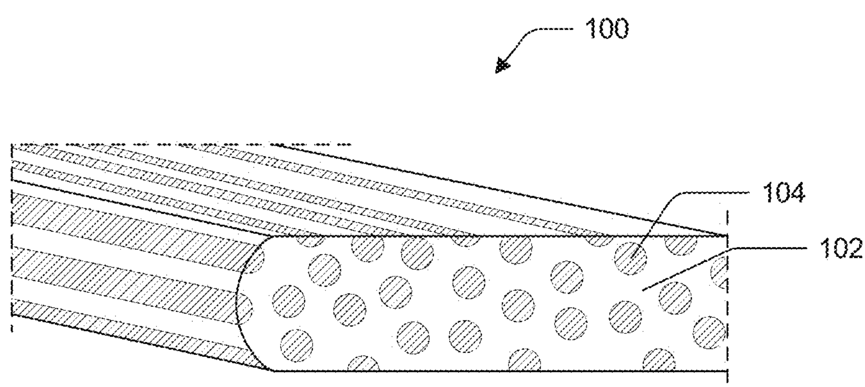
FIG. 1B shows a schematic cross-sectional illustration of a PMC, in accordance with some embodiments.

FIGS. 1A and 1B illustrate cross-sectional views of a PMC 100 showing the matrix 102 and the fiber 104. One of the primary shortcomings of previous and current PMC radiation curing technology is the poor mechanical properties resulting from poor fiber 104 to matrix 102 adhesion. It is believed that the lesser mechanical properties of a radiation cured material system, when compared with its thermally cured counterpart, is the lower performance of the interface. Consequently, the interface resin needs to be addressed more carefully for a radiation curing process than a thermal curing process as the time to achieve a good adhesion is reduced from hours to minutes. In other words, in thermally cured composites, the applied pressure and relatively long curing time allows the matrix and catalyst to permeate the interface resin and fibers and create a good bond between the fibers and the matrix material. In a thermally cured PMC, the matrix comprises a resin and a curing agent. The curing agent may constitute upwards of 30% of the matrix. However, combining the resin and the curing agent starts a chemical reaction within the matrix and the material must be thermally cured within a predetermined time period in order to produce an acceptable PMC. In many cases, the curing agent is only added to the resin immediately prior to using the matrix. Alternatively, or additionally, once the curing agent is added to the resin, the combination may be kept at a low temperature to inhibit chemical polymerization reactions.

Figure 2A:
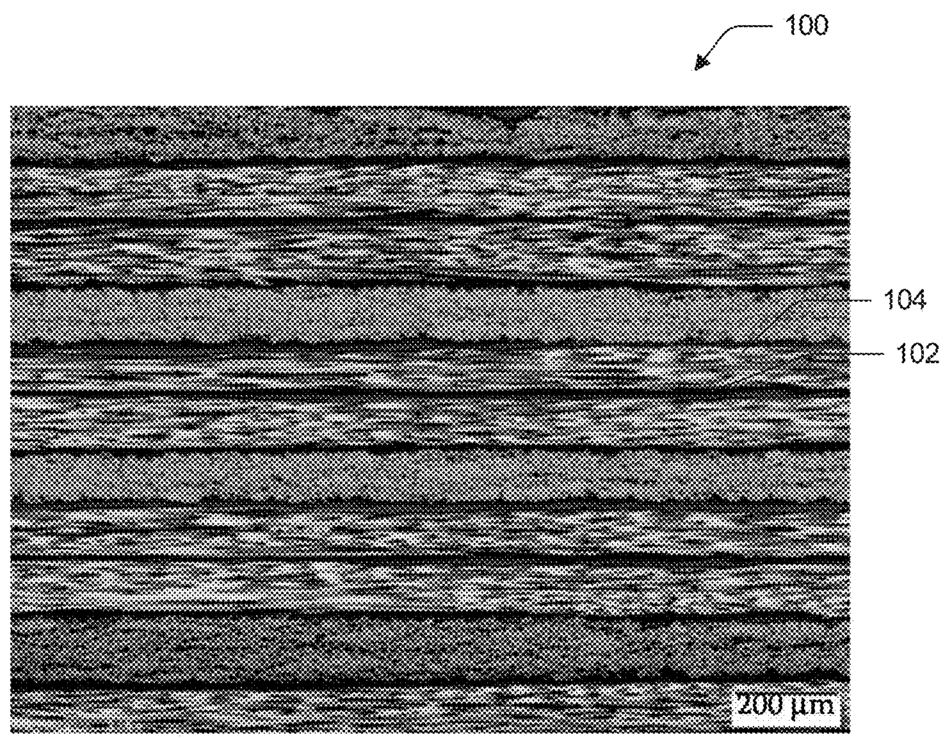
FIG. 2A illustrates a scanning electron microscopic ("SEM") image of a PMC showing a scale of 200 μm, in accordance with some embodiments.
Figure 2B:
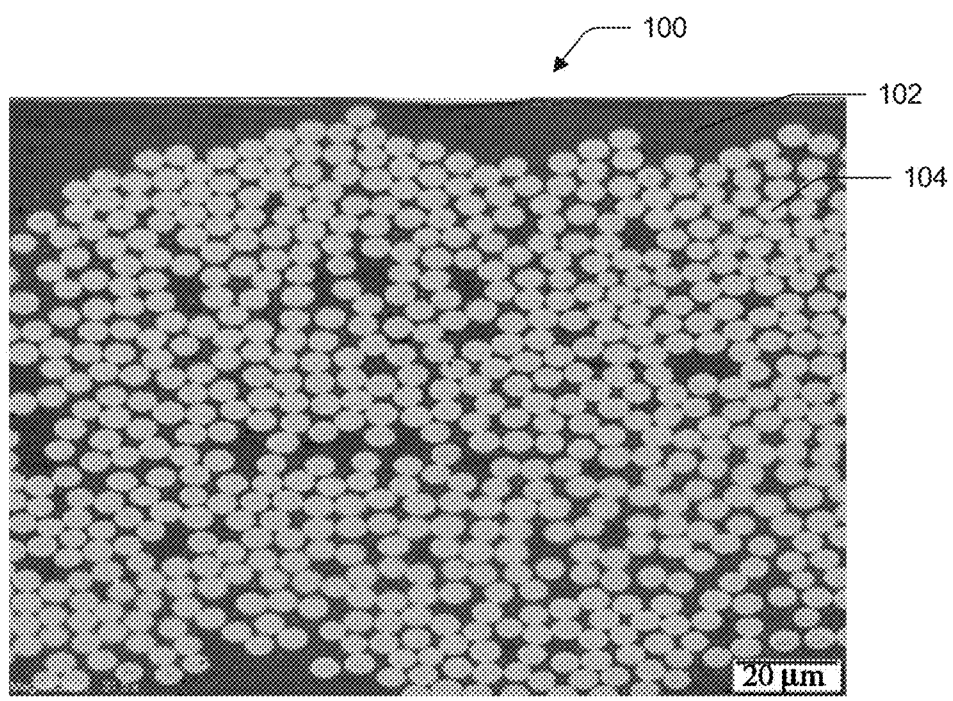
FIG. 2B illustrates a scanning electron microscopic ("SEM") image of a PMC showing a scale of 20 μm, in accordance with some embodiments.

FIGS. 2A and 2B illustrate microscopy images of a PMC with a resolution of 200 μm and 20 μm respectively. As can be seen in FIG. 2A, a plurality of fibers are oriented in different directions, which make up the layup according to a given stacking sequence. The cross section of the PMC is made up of various layers of fibers all going substantially the same direction within a given layer. In the example, the sample is formed to be quasi-isotropic by the directionality of the fibers in each layer being provided at 0, 45, 90, and −45 degrees relative to each other. FIG. 2B shows a cross-sectional image of the fibers within a layer showing the fiber/matrix interface.

Thermally cured composite processes may often include the step of wetting the reinforcing fibers 104 with an interface resin material, which is also a resin. However, the interface resin does not have a curing agent added to it. As a result, the fibers 104 can be woven and have substantial shelf life until combined with the matrix material 102 and therefore subject to the curing agent provided in the matrix material 102. When the combination of fiber, interface resin, and matrix are thermally cured, there is time, temperature, and chemically driven potential that drives the curing agent, a constituent of the matrix 102, into the interface resin. Without a curing agent in the interface resin, the interface resin will not cure properly. This manufacturing process works well with thermally cured composites but is not as effective for radiation-cured composites.

In a radiation cured composite, the curing happens in a matter of minutes and the matrix material does not have sufficient time or chemically driven diffusion potential to permeate the interface resin or the fibers and create a strong bond. Consequently, the interface resin on the fibers does not have access to the curing agent provided with the matrix material to cure as expected, thus causing a poor bond between the interface resin and the matrix material. Moreover, in radiation-cured composites, the curing agent is typically on the order of 1% to 3% of the matrix, in contrast to the upwards of 30% in a thermally curable matrix material. Not only is the chemical driving potential lower, the curing time happens in a matter of minutes, and the temperatures are very low in comparison to thermally cured composites. This makes it difficult for the curing agent to reach the interface resin to support an effective cure for the composite. The result is that typical radiation cured composite materials exhibit poor matrix and fiber adhesion, thus resulting in poor material performance.

In one aspect, adding a curing agent directly into the interface resin material would improve its functioning and the overall matrix dominated material properties, such as improvements in compression, in-plane shear, interlaminar shear, and fracture toughness. For example, pre-wetting the fibers with an interface resin that includes a curing agent and then adding the fibers to the resin matrix would provide substantial improvements to the final product after radiation curing.

As used herein, the term "interface resin" is a broad term and is used to describe any resin that has compatibility with the matrix and with the fiber. In other words, the interface resin is able to wet the fiber to provide good adhesion. In many instances, the interface resin material includes a curing agent and is applied to the reinforcing fibers before the fibers are formed into a desired shape during a manufacturing process. The catalyst may be provided in an amount of from about 0.5% to 10% of the matrix material by volume. In some instances, the catalyst comprises between about 1% and 5% of the matrix material by volume. In other instances, the catalyst is provided from about 1.5% to 3% by volume of the matrix material.

In some embodiments, the reinforcing fibers are wetted with a first matrix material, which may also be referred to as an interface resin material. The first matrix material includes a curing agent. The fibers may therefore be considered to be pre-impregnated with the first matrix material and the curing agent. The pre-impregnated fibers can be stored until ready for use. The pre-impregnated fibers may be used in any suitable manufacturing method and may be incorporated into a second matrix material to provide reinforcement to the second matrix material. The first matrix material of the pre-impregnated fibers may be the same or different than the second matrix material. Similarly, a curing agent in the first matrix material may be the same or a different catalyst than in the second matrix material.

Another disadvantage of thermally cured composite materials results from thermal stresses. As a composite material is cured at high temperature (e.g., typically above 350° F. 180° C. for a thermoset resin and about 700° F. 370° C. for thermoplastics), it experiences a significant change in temperature as it cools. Any change in temperature causes strain and stress in the material. These strains and stresses can lead to unwanted deformation (e.g., warping/bowing), or premature fracture when the thermal stresses are summed to the operating stresses. This phenomenon is compounded as the composite material is used in an environment having temperature gradients or extremely low temperatures when compared to the high thermal curing temperature.

For example, a composite material may be used in an environment that is extremely cold, such as, for example, less than −17° C., or less than −28° C., or colder. In these extreme environments, the thermally cured composite material may accumulate a high amount of thermally induced stress which can lead to degraded performance and/or failure of the material. Furthermore, thermal expansion or contraction of the composite material can lead to significant changes in the shape of the composite material, which may also lead to less than ideal performance characteristics.

An advantage of radiation cured composite materials is the ability to cure the composite material at any desired temperature. For example, where a composite material is formed into a part that is designed to be operated in an environment of around −17° C., the composite material may be formed and subjected to a temperature of −17° C. while it is cured. In this way, once the part is used in its intended operating environment, the internal thermal strains and stresses will be significantly lower than if the part had been cured at an ambient temperature of 24° C., or the typical elevated curing temperature of 180° C. This results in the formed part exhibiting improved material characteristics that are tailored for the intended operating environment. Furthermore, the part can be appropriately sized to meet strict tolerances even as the operating environment has a relatively low temperature. That is, when radiation-curing the part at the temperature of the intended operating environment, the part can be appropriately sized during formation without having to consider any change in shape caused by thermal contraction, which can be a significant issue, especially in thermally cured materials.

In typical thermal curing manufacturing processes, the materials used for forming the PMC, such as molds or mandrels, must be formed of a suitable material to withstand the temperatures required to cure the PMC, and are selected to typically exhibit a coefficient of thermal expansion as close as possible to the that of the PMC being cured, which is much smaller than that of aluminum alloys and steels. For that reason, molds are usually made out of invar which is expensive to manufacture and heavy. In some cases, the mold is made out of the same PMC material as the part being made. Therefore, a mold is required to make the mold, thus increasing the manufacturing time and materials. The PMC mold doesn't have the same durability as a metal mold and has a lower duration, increasing the frequency at which molds need to be fabricated when forming multiple PMC parts. In many fabrication processes, such as compression molding, transfer molding, pultrusion, or injection molding, the mold materials must be thermally robust, have good hardness (e.g., in some cases above about 150 BHN), and have the ability to withstand the pressure of the molding process. In many cases, molds are made of a variety of steels and must be machined, which is a time intensive and expensive process.

By contrast, radiation curing does not require elevated temperatures, which allow a wide variety of materials to be used to form the PMC. For instance, molds can be formed from a variety of foams, wood (even softwoods), 3D-printed materials, or other plastics, to name a few. Molds for radiation cured materials can be light, inexpensive, and easily formed.

Radiation curing offers the additional benefit of its fast cure time. In many instances, a radiation-cured PMC can be cured in a matter of minutes rather than hours as thermally-cured PMCs typically require.

A radiation-cured PMC can be cured by application of any suitable radiation source. In some implementations, an electron beam is directed at the PMC at a suitable intensity in order to initiate and sustain the polymerization reaction. For instance, an e-beam gun may consist of a cathode, a grid, and an anode, and is used to generate and accelerate the primary beam of electrons. Electron-beam processing causes cross-linking of the polymers in the PMC, which gives the PMC excellent characteristics such as: thermal resistance, stress crack resistance, tensile strength, modulus of elasticity, abrasion resistance, and creep resistance.

Figure 3A:
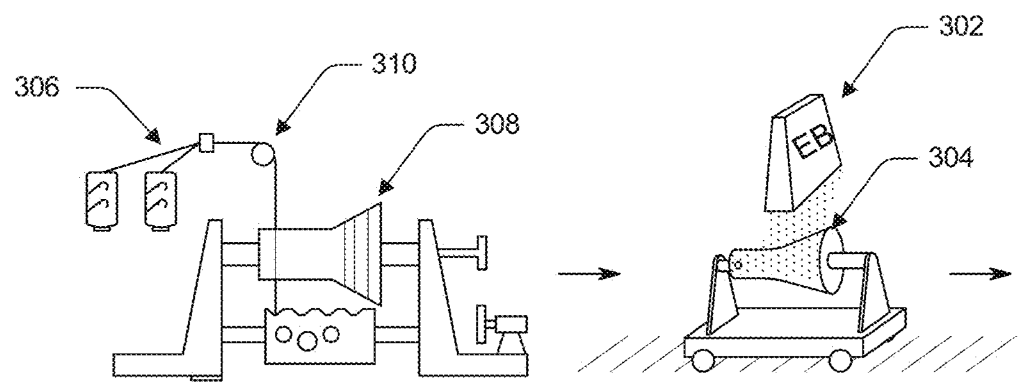
FIG. 3A shows a matrix coated fiber wrapped around a mandrel and cured by a radiation source, in accordance with some embodiments.

FIG. 3A illustrates an embodiment in which a radiation source 302, such as an e-beam gun in some examples, may be applied to the PMC 304 at any suitable time during the manufacturing process once the fiber and matrix have been combined. For example, a filament winding process involves winding filaments 306 under tension around a rotating mandrel 308. A carriage 310 traverses along the axis of the mandrel to space subsequent winds of filament that pass through a delivery eye. The radiation source 302 can be located in any suitable position relative to the mandrel, in close proximity to the carriage, and in some cases, can be mounted on the carriage to direct radiation to the filament that has already been wound. In this way, the radiation source gun can follow the delivery eye to deliver radiation energy shortly after the filament has been would and before the winding process has been completed. The result is that the filament winding and radiation curing can be performed at substantially the same time and the curing may be completed shortly after the winding process is completed. There is no need to wind filament around a mandrel and then transfer the mandrel to an autoclave or oven for several hours to wait for proper curing of the PMC.

The radiation source can be any suitable ionizing source, and may include, for example, ultraviolet radiation, visible light radiation, electron radiation, X-ray radiation, gamma ray radiation, or some other type of radiation. In some cases, photoinitiation is established through the use of light emitting diodes (LEDs) that provide a desired wavelength and intensity of light, and one or more photoinitiators are selected and used within the matrix material, the interface resin, or both. The photoinitiators within the matrix material and the interface resin may be different and may be selected to react differently to the applied radiation. In some cases, the interface resin is cured before the matrix material by the selective application of radiation to provide different cure characteristics of the various components within the PMC. In some cases, the photoinitiator is the same in the interface resin and the matrix material.

Radiation curing is initiated when the energy which matches the curing agent is applied, and does not cure otherwise. Therefore, a radiation cured part can be cured at a significant time after the lamination is completed. This cannot be done with thermally cured systems, which need to be cured shortly after lamination and fiber impregnation is done. This can pose problems for thermally cured material systems, such as where the part is large and the resin infusion process is done too slowly, curing can occur before the injection is completed resulting in a faulty process.

This process of following the layup process with curing is equally applicable to other forming techniques, such as mandrel wrapping, in which a sheet of prepreg material is wrapped around a mandrel. The e-beam gun can follow the wrapping process to cure the prepreg sheet material shortly after it is wrapped around the mandrel.

Figure 3B:
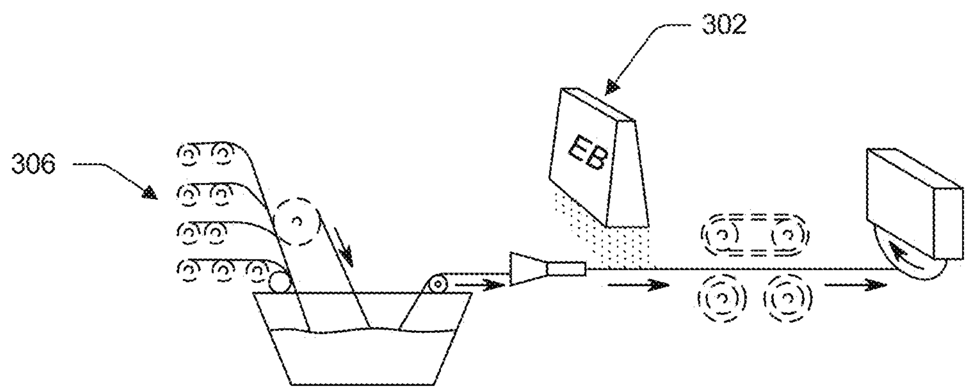
FIG. 3B shows a plurality of fibers being coated by a matrix material, and being used to form a part through pultrusion and being cured by radiation, in accordance with some embodiments.
Figure 3C:
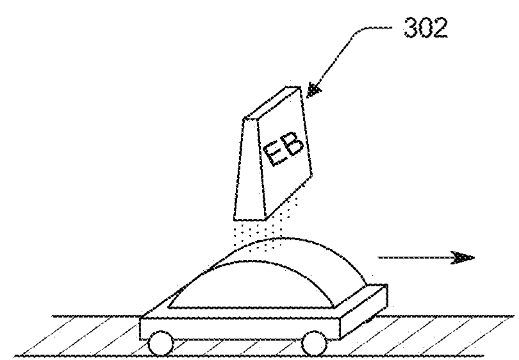
FIG. 3C shows a molded part formed from a PMC being subjected to a radiation source electron beam for curing; in accordance with some embodiments.

FIG. 3C illustrates a lay-up process in which the PMC is laminated as a mat or sheet and applied to a mold or form, which may be a 3D form. The PMC laminate may be held to the mold through any suitable process, and may include vacuum forming, a multi-part mold in which at least one component of the mold is transparent or translucent to the applied radiation, hydrostatic pressure, or some other way of shaping the PMC to the mold. The mold can then be subjected to a radiation source and the part can be cured while held in shape by the mold. In some embodiments, one or more of the mold parts is transparent to allow the radiation source to pass through it and cure the PMC. In some cases, UV radiation is used to cure the PMC through the mold. In some embodiments, an electron beam is passed through the mold to cure the PMC within the mold. In some embodiments, a vacuum bag may securely press the PMC against a mold, and any bubbles, warps, runs, sags, or other imperfections can be dealt with while the matrix is in a liquid state. Once the imperfections are addressed, a radiation source can be applied to cure the PMC.

It should be appreciated that while FIGS. 3A-3C illustrate and e-beam radiation source, other types of radiation are equally applicable to the disclosed process steps, such as UV, X-ray, gamma ray, visible light, among others.

Figure 4:
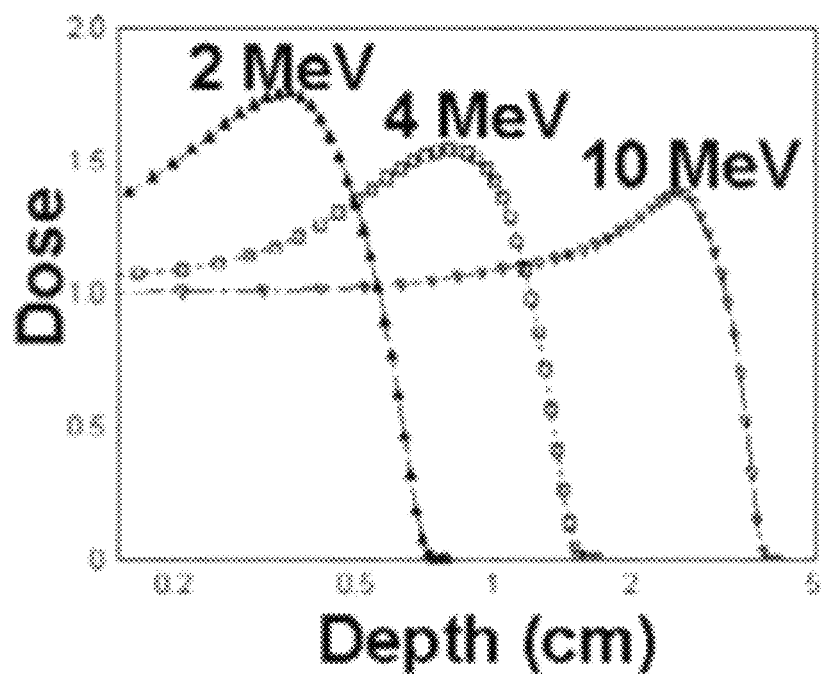
FIG. 4 shows a dose/depth curve of electrons at differing energies within a PMC, in accordance with some embodiments.

FIG. 4 illustrates a penetration depth and dose of an e-beam at various intensities. The illustrated graph uses a water medium as a surrogate, and generally indicates that the surface dose of an e-beam is generally lower as the intensity of the e-beam increases due to electron scattering. It also illustrates that with increasing intensity, an e-beam provides a maximum dose at increasing depths within the material. Because of the penetrating nature of the radiation, PMC parts can be made thicker than is possible with traditional thermally cured PMCs. The intensity of the radiation can be varied, applied through timed pulses, and can be focused or diffused to provide desired radiation curing profile characteristics. Similarly, the energy of the radiation can be varied according to a desired energy profile applied to the PMC. In some instances, the energy of the radiation dictates the penetration profile and the intensity of the radiation dictates the curing rate. Either or both of these attributes can be selected based upon the matrix materials, curing agents, fibers, part thickness and desired curing profile. For example, the radiation energy may be provided in a range from about 2 MeV to about 10 MeV. Higher energies may be used, such as up to about 15 MeV or higher depending on material and geometry selection. Similarly, lower energies are also contemplated, such as for curing relatively thin composite materials where only a very slight penetration depth is required. In these instances, the radiation energy may be in the KeV range. Additionally, using lower radiation energies may provide surface curing characteristics in instances where the surface is desired to be cured differently than the composite material below the surface. In some embodiments, radiation is applied in different intensities to apply curing dose to different depths within the PMC. For instance, a first intensity radiation may be applied initially to provide a curing dose to a first depth. A second intensity, lower than the first intensity, may subsequently be applied to provide a curing dose to a second depth and at a higher peak dose. A third intensity, lower than the second intensity, may subsequently be applied to provide a curing dose to a third depth and at a higher peak dose than the second intensity provides.

In some instances, the fibers are pre-impregnated with a resin and a curing agent. The fibers may have a long shelf life since the resin and curing agent will not react to initiate polymerization in the absence of applied radiation. Similarly, even where the fibers are incorporated into a matrix resin, the resin will not begin to polymerize in the absence of applied radiation. Consequently, pre-impregnated fibers may be stored for indefinite periods of time.

This allows for thermosets the effective ability to have a relatively long shelf life and can then be radiation cured at a later time. In some cases, thermosets that have been sitting for an extended period of time may be treated to become workable prior to radiation curing. The treatment may be any suitable treatment and may be a thermal treatment, liquid treatment, radiation treatment, or some other form of treatment to improve the workability of the thermoplastic.

By providing pre-impregnated reinforcing fibers that have a curing agent, a chemical bond between the reinforcing fibers and a matrix material used for forming components is greatly improved over current techniques. Furthermore, by curing at any desired temperature, the formed PMC part can be made nearly absent of thermal stress. Consequently, parts having a thinner cross-section than is possible with thermally-cured composite materials can exhibit similar material properties, such as strength, stiffness, fatigue, and shear properties. In some cases, the material properties of a radiation cured composite material may well far exceed the characteristics of a similar thermally cured composite material, while allowing for thinner and lighter parts thus using less material.

Figure 5:
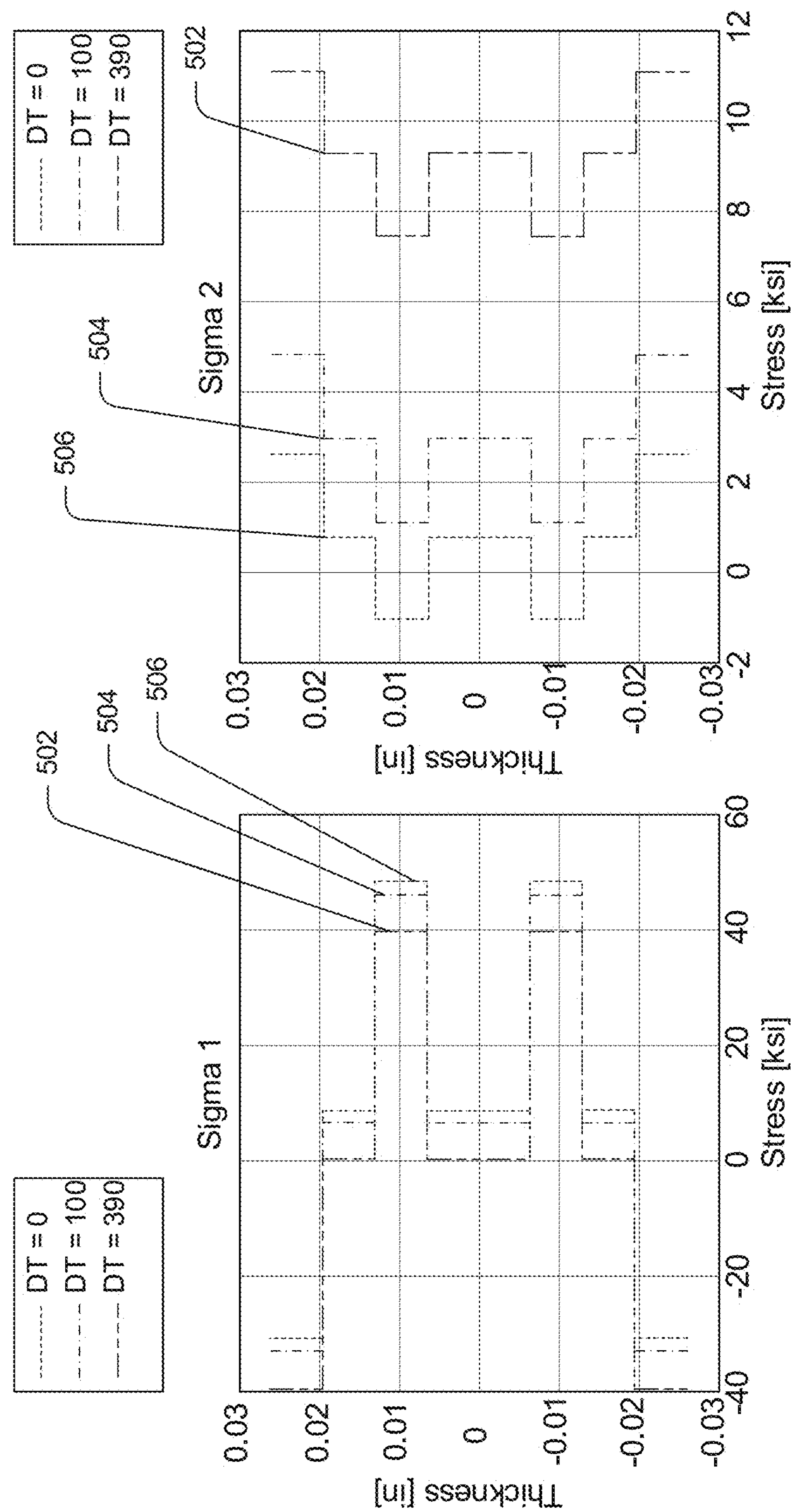
FIG. 5 illustrates the stress distributions in the fiber and matrix through the thickness of a PMC made of unidirectional laminae, as a result of varying the curing temperature and varying the thermal gradient; in accordance with some embodiments.
Figure 8:
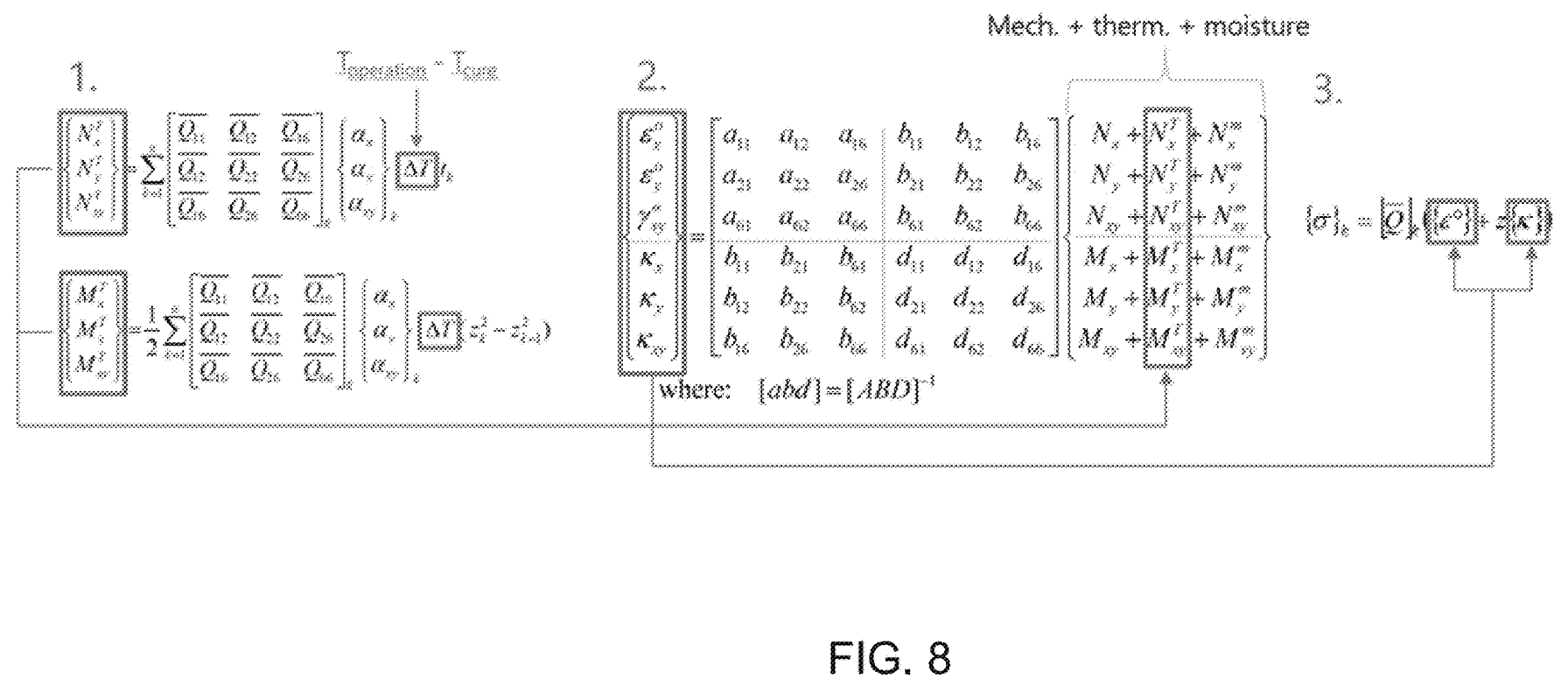

FIG. 5 illustrates the results of an analysis using the Classical Lamination Theory. The mathematical background is shown in FIG. 8. The analysis shows the stress profile through the thickness in the 1-direction (fiber direction) and 2-direction (matrix direction; perpendicular to the fiber direction, in the plane) as a function of the thermal gradient ("DT") obtained as: curing—operational temperature.

The variables illustrate effects of thermal curing of typical thermoset advanced composite material system used in aerospace in which DT=390° F.; curing temperature=350° F., operational temperature=−40° F. (which is representative of typical environments of in-flight conditions of commercial airplanes.

Figure 6:
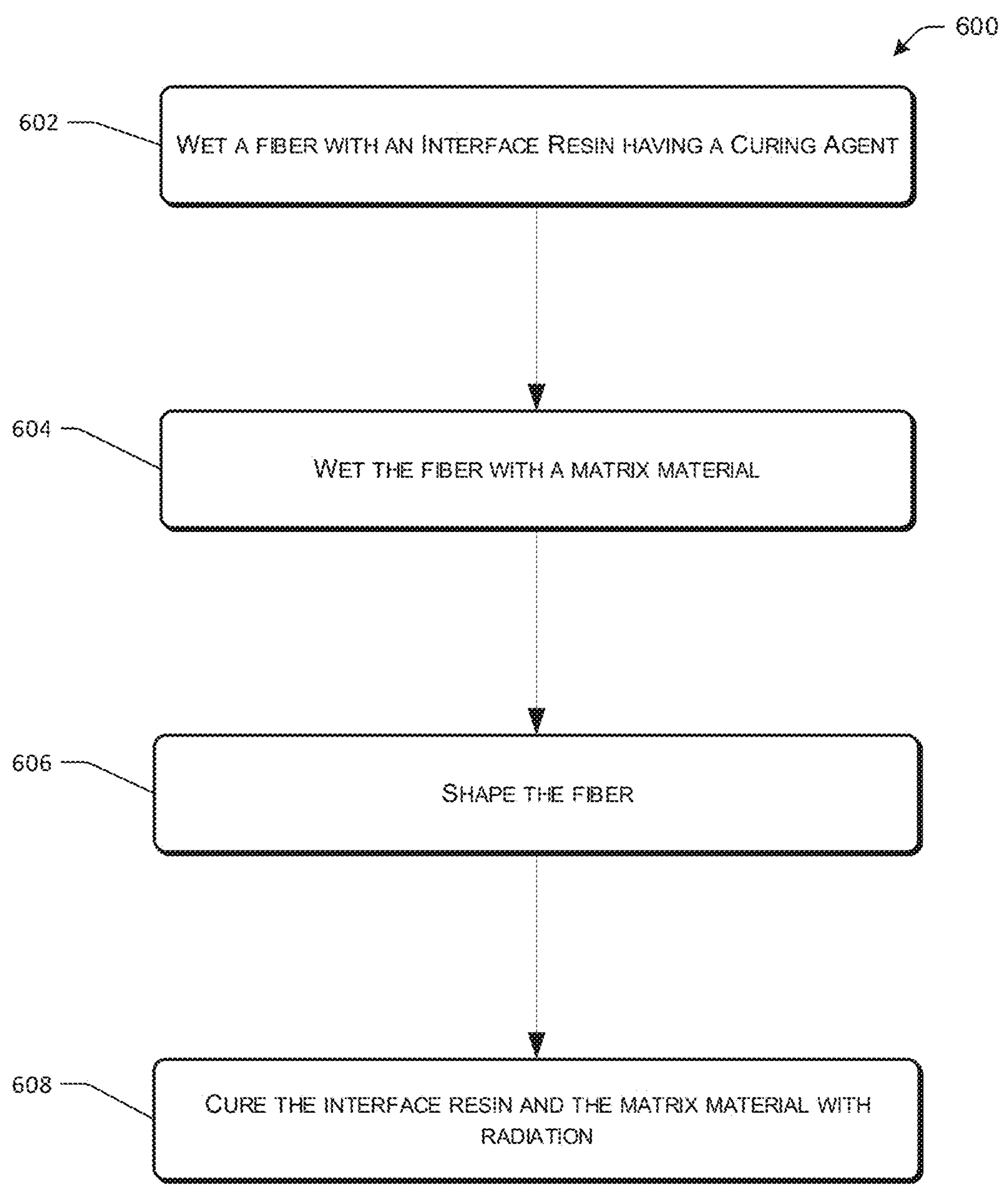
FIG. 6 is an exemplary process diagram for radiation curing a PMC; in accordance with some embodiments.

FIG. 6 shows a process flow diagram 600 for radiation curing a PMC. At step 602, a fiber is wetted with an interface resin, the resin having a curing agent. Of course, while a fiber is described, it should be apparent than a bundle, a strand, a weave, or some other form of singular or multiple fibers are included and encompassed herein. The curing agent may be any suitable curing agent, and in the case of UV radiation curing, may be any suitable photoinitiator curing agent. The fiber may be a single fiber, a fiber bundle, a strand of fibers, a mat of fibers, or some other arrangement of one or more fibers. Applying the interface resin may be accomplished through any suitable mechanism, and may involve, drawing the fiber through a reservoir or interface resin, spraying the fiber with the interface resin, placing the fiber in a pool of interface resin, or some other suitable method of applying the interface resin to the fiber.

At step 604, the fiber is wetted with a matrix material, through any suitable process now known or later developed. The matrix material has a curing agent that may be the same or different to the curing agent provided in the interface resin.

At step 606, the fiber is shaped through any suitable shaping process, such as, for example, winding the fiber around a mandrel, molding the fiber with a mold, or some other shaping process. Step 606 may be performed before or after step 604, that is, the fiber may be shaped, such as by a preform, and then the matrix material is infused.

At step 608, the interface resin and the matrix material are cured by application of suitable radiation. In some cases, the radiation is a single source of radiation, which may be applied at a constant intensity. In some cases, the radiation is pulsed. In some cases, the radiation intensity is varied over time. In some cases, more than one type of radiation is applied.

Once the PMC is cured to a satisfactory degree, the PMC may be removed from the mold or mandrel and the process may be repeated for subsequent PMC parts.

According to some embodiments, additives may be provided in the interface resin, the matrix material, or both. Examples of additives include, without limitation, stabilizers, color pigments or dyes, defoamers, adhesion promoters, flattening agents, wetting agents, and slip aids.

Figure 7:
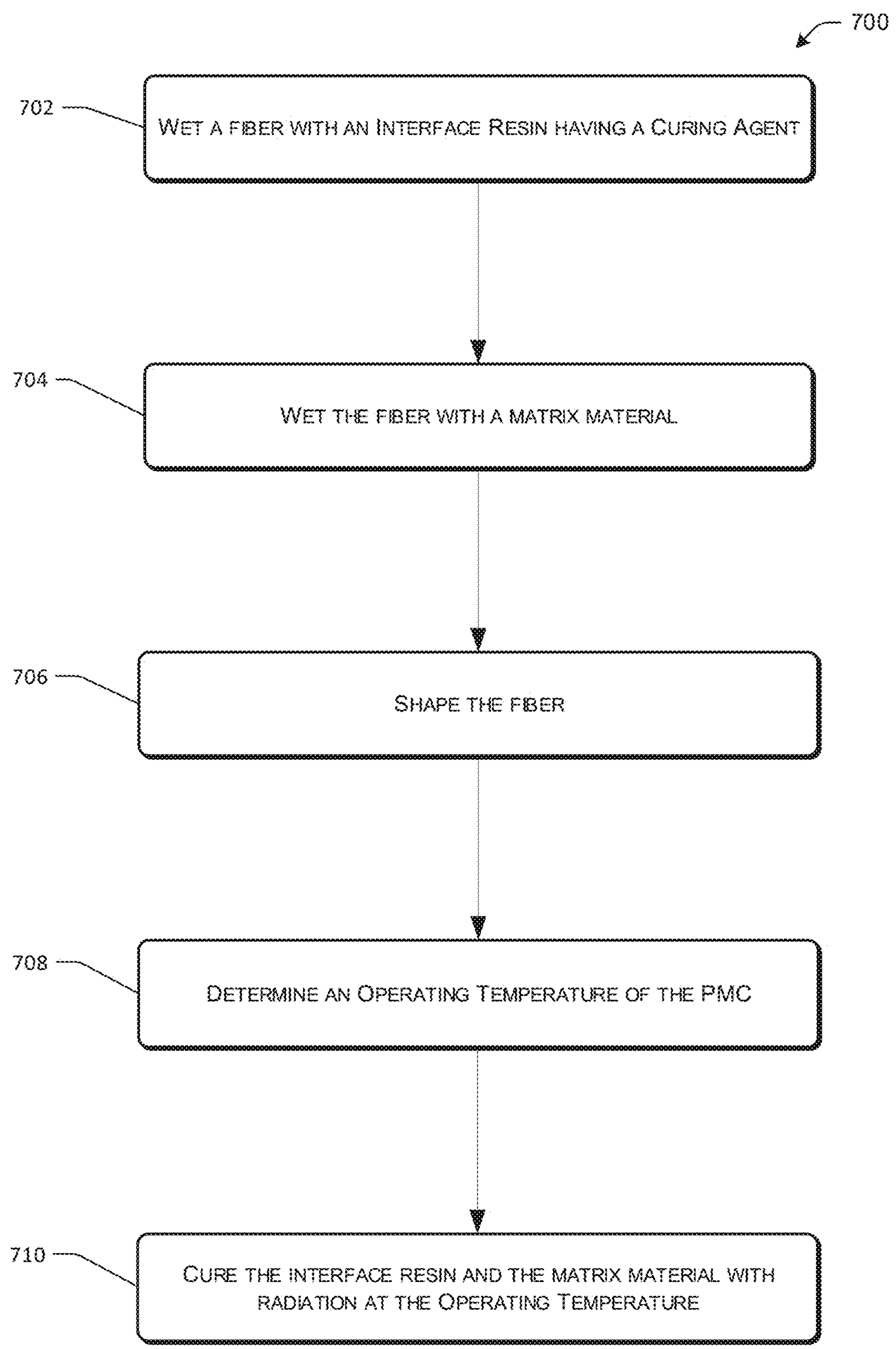
FIG. 7 is an exemplary process diagram for radiation curing a PMC, in accordance with some embodiments.

FIG. 7 shows a process flow diagram 700 for radiation curing a PMC. In some cases, the process steps shown in FIG. 7 are substantially similar to the process steps shown in FIG. 6. At step 702, a fiber is wetted with an interface resin in which the interface resin has a curing agent. At step 704, the fiber is wetted or otherwise incorporated into a matrix material. At step 706, the fiber is shaped by any suitable process. These steps may be performed in an alternative order. For example, the fibers may be shaped prior to being infused with the matrix resin. Of particular note, the process of FIG. 7 includes the step 708 of determining an operating temperature of the PMC. In some cases, the operating temperature may be room temperature, such as around 70° F. Some PMC parts are designed to be operated at extreme temperatures, such as those found at high elevations, including mountaintops, the stratosphere, low earth orbit, or outer space. In some embodiments, a determined operating temperature is from about −60° F. to about 0° F. In some embodiments, a determined operating temperature is from about −40° F. to about 0° F. At step 710, the interface resin and the matrix material are cured at the operating temperature. Curing the interface resin and matrix material close to the operating temperature allows the part to be formed with tight tolerances based upon the operating environment, and reduces thermal stresses, among other things. For instance, curing a PMC at operating temperatures may have a tendency to avoid unintended thermal deformations, such as warpage and springback. With typical thermally cured materials, springback must be accounted for in the molding process because as the part cools down, the thermal strains will cause deformation. This phenomenon is greatly diminished with curing parts at the intended operating temperature.

FIG. 8 shows the calculation using Classical Lamination Theory in support of the example of FIG. 5. The thermo-mechanical mechanics of each lamina is modelled using the plane-stress 2-D relation. The compliance form of CLT is shown in 2, where the thermal in-plane forces and moments per unit length, NAT an MAT, are obtained by integration through the thickness of the thermal forces and moments, as shown in 1. The resulting stresses in each ply can be calculated using the equation shown in 3, which for each ply uses the appropriate plane-stress stiffness matrix and the global (laminate) mid-plane strain and curvature.

Figure 9A:
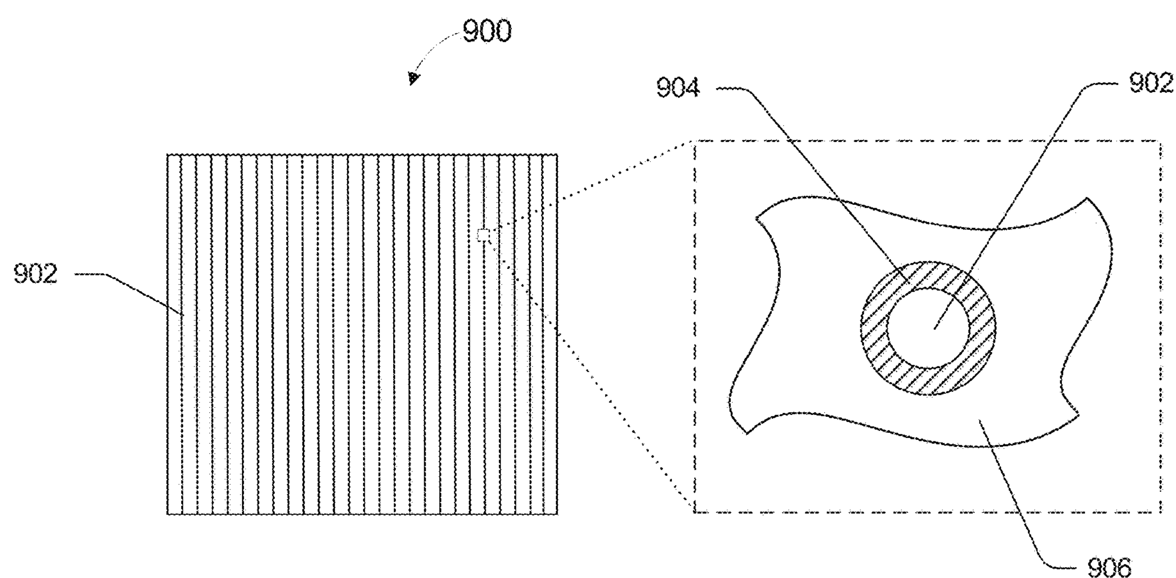
FIG. 9A is a representation of a PMC showing a closeup of a fiber within a matrix material.
Figure 9B:
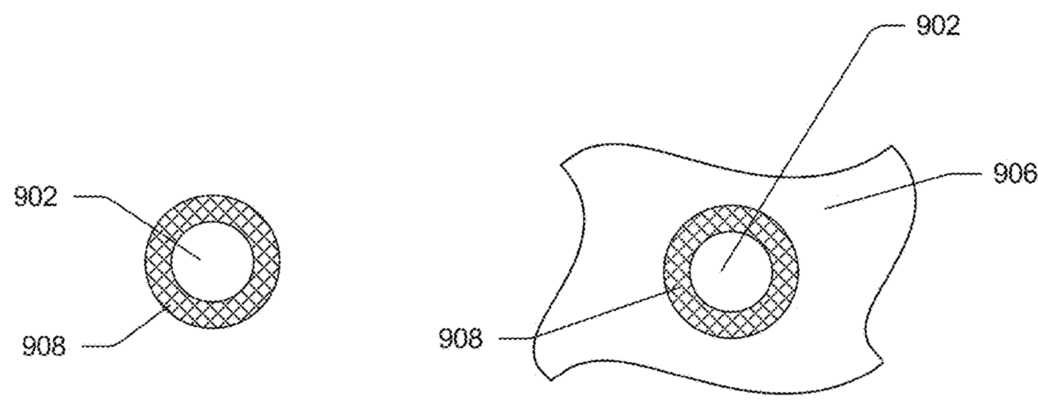
FIG. 9B is a representation of a radiation-cured fiber with an interface resin and curing agent.

FIGS. 9A and 9B illustrate a representation of a fiber incorporated into a PMC. As shown in FIG. 9A, which shows the typical PMC constituents for a thermally cured part, a PMC 900 is shown that includes a plurality of fibers 902. A close-up view shows a single fiber 902 encapsulated by an interface resin 904. The fiber 902 is incorporated into a matrix material 906 that includes a curing agent. In many cases, the interface resin 904 does not include a curing agent, which allows the fiber 902 with the interface resin 904 to be stored separately from the matrix material 906. Typically, the matrix material 906 does not include a curing agent until the matrix material 906 is mixed with the fiber 902 and the PMC part is ready to be formed. In some instances, curing agent is added at the time of forming the part since polymerization begins to happen almost immediately once the curing agent is added to the matrix material.

As shown in FIG. 9B, which shows the typical constituents for a radiation cured part, a fiber 902 is encapsulated with an interface resin 908 that includes a curing agent within the interface resin. The fiber 902 and interface resin 908 with curing agent can be stored for extended periods of time until ready for use. The fiber 902 and interface resin 908 can be incorporated into a matrix material 906 that includes a curing agent. As described above, the matrix material with curing agent can be premixed and stored until ready for use. Similarly, the fiber 902 with interface resin 908 can be premixed with the matrix material 906 and stored for an extended period of time before use. The combination of the fiber 902, interface resin 908 with curing agent, and matrix material 906 can be combined and stored well-before the materials are ready to be used to form a part, and may heated or cooled to an anticipated operating temperature of the formed part before forming and/or curing the PMC part.

A person of ordinary skill in the art will recognize that embodiments described herein provide a reduction in thermal strains and stresses. Conventional thermoset and thermoplastic polymeric matrix composite manufacturing processes require curing temperatures above 250° F. and 700° F., respectively, which creates thermally induced strains and stresses in the cured part once it cools. Radiation curing at room temperature minimizes the thermally induced strains and stresses caused by thermal curing. Radiation curing at operating temperature further minimized the thermally induced stress when a part is in operation. Due to the low temperature curing, expensive thermally robust molds are not required, neither are ovens or autoclaves. Many of the radiation curable thermoset resins do not have a shelf live and do not require refrigeration to maintain shelf life. Irradiation curing requires minutes to complete as opposed to typically hours for thermally cured composites. There is also a significant benefit in terms of manufacturing and repairs, as radiation cured composites can be used for bonding. Exothermic curing limits the thickness of the composite, requiring multiple layers to increase thickness. However, this is not the case with radiation cured composites as radiation can permeate through the composite to cure at greater depths than is possible with thermal curing.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

As used herein, the term "or" is used inclusively to refer items in the alternative and in combination. As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A process, comprising:

wetting a reinforcing fiber with a first liquid polymer material, the first liquid polymer material having a first curing agent mixed therein;

forming the reinforcing fiber into a desired shape;

applying a second liquid polymer material, the second liquid polymer material having a second curing agent mixed therein; and applying radiation to the reinforcing fiber, the first liquid polymer and the second liquid polymer to cause the first liquid polymer and the second liquid polymer to cure into a hardened form.

2. The process of claim 1, wherein the process is performed at ambient temperature.

3. The process of claim 1, wherein the step of applying radiation is performed at a temperature below ambient temperature.

4. The process of claim 1, further comprising cooling the reinforcing fiber, the first liquid polymer, and the second liquid polymer to a temperature below 10° C. prior to the step of applying radiation.

5. The process of claim 1, wherein the step of applying radiation is performed at a temperature selected to approximate an environmental temperature where the hardened form will be used.

6. The process of claim 1, wherein the first liquid polymer material and the second liquid polymer material are different materials.

7. The process of claim 1, wherein the first curing agent and the second curing agent are different materials.

8. The process of claim 1, wherein the step of applying radiation is performed while the step of forming the reinforcing fiber into the desired shape is being performed.

9. The process of claim 1, wherein the step of applying radiation is repeated two or more times.

10. The process of claim 1, wherein the step of applying radiation to the reinforcing fiber is a first dose of radiation, and further comprising applying a second dose of radiation to the reinforcing fiber, the first liquid polymer and the second liquid polymer.

11. The process of claim 10, wherein the first dose of radiation is at a first intensity, and wherein applying the second dose of radiation is performed at a second intensity different from the first intensity.

12. The process of claim 1, wherein the step of applying radiation to the reinforcing fiber, the first liquid polymer and the second liquid polymer is performed by pulsing a radiation source.

13. The process of claim 1, further comprising the step of storing the reinforcing fiber after the step of wetting the reinforcing fiber with the first liquid polymer material.

14. The process of claim 1, wherein the step of forming the reinforcing fiber into a desired shape is performed by placing the reinforcing fiber in contact with a mold.

15. The process of claim 14, wherein the mold is one or more of a plastic, a foam, or a wood.

16. The process of claim 1, wherein the first liquid polymer material is a thermoset material.

17. The process of claim 1, wherein the step of applying radiation comprises activating an electron beam.

* * * * *